United States Patent [19]
Sickels et al.

[11] Patent Number: 5,329,694
[45] Date of Patent: Jul. 19, 1994

[54] APPARATUS FOR ATTACHING A FASTENER TO AN ENCLOSED STRUCTURE

[75] Inventors: David W. Sickels, Plymouth; Robert E. Sills, Livonia, both of Mich.

[73] Assignee: Multifastener Corporation, Detroit, Mich.

[21] Appl. No.: 44,360

[22] Filed: Apr. 7, 1993

[51] Int. Cl.$^5$ .............................................. B23P 19/00
[52] U.S. Cl. ................................... 29/798; 29/243.518; 29/243.519
[58] Field of Search ................ 29/798, 243.5, 243.517, 29/243.518, 243.519, 243.55, 432.2, 510

[56] References Cited

U.S. PATENT DOCUMENTS

| | | | |
|---|---|---|---|
| 139,374 | 5/1873 | Deane | 29/243.518 |
| 350,701 | 10/1886 | Schoendelen et al. | 29/243.518 |
| 866,644 | 9/1907 | Green | 29/243.518 |
| 1,777,772 | 10/1930 | Shera . | |
| 1,992,855 | 2/1935 | Bell . | |
| 3,526,955 | 9/1970 | Cilione et al. . | |
| 3,851,373 | 12/1974 | Shinjo | 29/798 |
| 3,947,950 | 4/1976 | Adams | 29/243.518 |
| 4,985,978 | 1/1991 | Milliser et al. . | |

Primary Examiner—Mark Rosenbaum
Assistant Examiner—David P. Bryant
Attorney, Agent, or Firm—Howard & Howard

[57] ABSTRACT

The disclosed method and apparatus is adapted to attach a self-attaching fastener, such as a pierce or clinch nut or stud to a metal wall of an enclosed structure, such as a tube, from inside the structure. The method includes rigidly supporting the self-attaching fastener within the enclosed structure on an anvil with the fastening portion extending toward and located adjacent an inner surface of the wall. A die member is then driven against the outer surface of the wall to deform the wall into locking engagement with the self-attaching fastener. Where a pierce nut or stud is used, the nut simultaneously pierces the wall from inside the structure and clinches the wall as the die member is driven against the outer surface of the wall. The apparatus includes an expandable anvil assembly having opposed surfaces which conform generally to the opposed surfaces of the enclosed structure and a pocket which receives and rigidly supports the body portion of the self-attaching fastener. The anvil assembly further includes relatively movable parts having mating inclined surfaces and the parts are moved to expand or contract the anvil assembly. The method then includes inserting the body portion of a self-attaching fastener in the anvil pocket, inserting the anvil in the enclosed structure, then expanding the anvil to locate or position the fastener adjacent the inner surface of the wall. The die member then installs the nut in the wall. Finally, the anvil is contracted to remove the anvil from the assembly.

10 Claims, 5 Drawing Sheets

APPARATUS FOR ATTACHING A FASTENER TO AN ENCLOSED STRUCTURE

The present invention relates to a method and apparatus for permanently attaching a self-attaching fastener, such as a pierce or clinch nut or stud to a metal wall of an enclosed structure, such as a tube, from inside the structure. For example, the method and apparatus of this invention may be utilized to install a conventional pierce or clinch nut in structural steel tubing, such as used by the automotive industry for structural support, from inside the tube.

BACKGROUND OF THE INVENTION

Self-piercing and clinching fastener have been used for many years in mass production applications, particularly by the automotive industry, to attach components, for example, to structural elements. Such self-attaching fasteners normally include a body portion and a projecting fastening portion. The installation apparatus includes an installation head having a reciprocating plunger and a die member or die button which rigidly supports the plate or panel to which the self-attaching fastener is to be installed. In a typical mass production application, the installation head and die button are installed in the opposed die platens of a die press which may simultaneously form the plate or panel into a contoured shape. Several self-attaching fasteners may be installed in the plate or panel with each stroke of the die press.

The body portion of the self-attaching fastener is supported in the reciprocating plunger of the installation head and the fastening portion extends axially from the plunger. When the die press is reciprocated to close the press, the plunger of the installation head drives the fastener into the panel. Where the fastener is a self-piercing fastener having a pilot or barrel portion, the fastener pierces a slug from the panel and the pilot or barrel portion is then received through the pierced panel opening. Such fasteners may also be installed in panels having a preformed panel opening. The die button then deforms the panel adjacent the panel opening into locking engagement with the fastener. Examples of pierce nuts and installation tooling are disclosed in U.S. Pat. Nos. 3,152,628, 3,648,747, 3,711,931, 4,242,793 and 4,971,499, all assigned to the assignee of the present application.

More recently, self-attaching stud and nut fasteners have been developed and commercialized having an annular barrel portion which projects from the body portion of the fastener. The barrel portion performs a similar function to the pilot portion of the pierce and clinch nuts described in the above-referenced U.S. patents; however the barrel portion of the fastener is deformed radially outwardly simultaneously with the deformation of the panel to form a very secure mechanical interlock between the fastener and the panel. U.S. Pat. Nos. 4,711,021, 4,713,872, 4,915,558 and 4,831,698 disclose typical examples of such self-attaching studs and nuts and commercial embodiments of the installation tooling.

The installation tooling for such self-attaching fasteners, however, places certain limitations upon the use of such fasteners. Where the installation head is attached to the upper die shoe in a "down pierce" arrangement, the panel and die button are rigidly supported in the lower die shoe. In an "up pierce" arrangement, the pierce nut must be rigidly supported in the lower die shoe and the die button is in the upper platen. Thus, it is not possible to install a self-attaching fastener of the type described above in a tube or enclosed structure, particularly from inside the structure. The tube will collapse under the force of the installation unless the wall to which the fastener is being attached and die button are rigidly supported. However, structural metal tubes are now used in many applications, including automotive applications, requiring attachment of components and other structural members to the structural metal tubes. The thickness of the wall of the metal tube may be ⅛ inch or greater. In many applications, the structural tube is preferably flattened at the point of connection. Thus, attachment of a component to a structural metal tube may require flattening of the tube at the point of connection, then welding a weld nut to the flattened area, or use of a clamp. The method and apparatus of the present invention is particularly suitable for attaching self-attaching nuts of the type described above to structural metal tubes or the metal wall of an enclosed structure, from inside the tube or structure. The self-attaching fastener may be installed with one stroke of the press and the area surrounding the fastener is simultaneously flattened to form a cradle or saddle for attachment of a second structural element or component. Thus, the method and apparatus of this invention solves a difficult problem associated with prior methods and apparatus, permitting the use of conventional self-attaching fasteners in enclosed structures, such as structural tubes.

SUMMARY OF THE INVENTION

As set forth above, the method and apparatus of this invention is particularly adapted to attaching self-attaching metal fasteners to a wall of an enclosed structure, such as a structural metal tube, from inside the structure. Self-attaching fasteners of the type disclosed herein generally include a body portion and a projecting fastening portion. Pierce and clinch nuts include a pilot portion and a body portion including panel supporting surfaces on at least opposed sides of the pilot portion. The nut further includes a groove adjacent the pilot portion which receives panel metal during installation of the nut in a plate or panel. Alternatively, the self-attaching fastener may include an annular barrel portion which projects from a body portion having a radial flange portion. The method and apparatus of this invention will now be described with reference to a universal pierce nut of the type disclosed, for example, in U.S. Pat. No. 3,845,860. It will be understood, however, that other types of self-attaching fasteners may be used, including the fasteners disclosed in the above-referenced U.S. patents.

The method of this invention includes rigidly supporting the self-attaching fastener inside the enclosed structure on an anvil with the body portion rigidly supported on the anvil and the fastening portion extending toward and located adjacent an inner surface of the wall. A die member is then driven against an outer surface of the wall to attach the panel to the fastening portion of the fastener. The die member preferably includes an opening configured to receive the projecting fastening portion of the self-attaching fastener as the fastener is received through an opening in the metal wall and a die surface on opposite sides of the die opening. Where the fastener is a self-piercing fastener, the fastening portion of the fastener cooperates with the die opening to pierce a slug from the wall and the wall is then driven toward the body portion of the fastener to drive the fastening portion through the wall opening. Alternatively, the wall may include a preformed opening configured to receive the fastening portion of the fastener. The method then includes continuing to drive the die member against the wall outer surface. The die portions on opposite sides of the die opening then permanently deform the wall into locking engagement with the fastening portion of the fastener, forming a secure mechanical interlock between the wall and the self-attaching fastener.

In the most preferred method and apparatus of this invention, the anvil comprises an anvil assembly having opposed surfaces configured to conform to the inner surface of the wall and an opposed surface. Where the enclosed structure is a cylindrical tube, the opposed surfaces of the anvil assembly are preferably cylindrical. A pocket is provided in the cylindrical surface which receives and rigidly supports the body portion of the fastener. In the most preferred embodiment, the anvil assembly is expandable to locate the fastening portion adjacent the inner surface of the wall during installation and retractable to remove the anvil assembly from the enclosed structure following installation.

The preferred method of this invention then includes inserting the body portion of the self-attaching fastener on a support surface of the anvil. The anvil with the self-attaching fastener is then inserted into the enclosed structure with the fastening portion located opposite the inner wall surface. The method then includes moving the fastener rigidly supported on the anvil toward the wall to locate the fastening portion adjacent the wall inner surface. The die member is then driven against the outer wall surface to secure the self-attaching fastener to the wall, as described. Finally, the anvil assembly is contracted to remove the anvil assembly from the enclosed structure.

As described above, the method and apparatus of this invention is particularly, although not exclusively adapted to installing self-attaching fasteners in a tube, such as a structural steel tube, from inside the tube. Further, the preferred embodiment of the tube and fastener assembly include a depressed flatten portion surrounding the fastener. Thus, in the most preferred embodiment of the installation apparatus, the anvil assembly includes a saddle-shaped depression in the cylindrical surface surrounding the fastener pocket and the die member includes a mating saddle-shaped embossment surrounding the die opening. The die member then deforms the tube wall into the saddle-shaped depression in the anvil during installation of the self-attaching fastener. In the most preferred embodiment, the fastening portion of the fastener is then installed generally flush with the lower surface of the saddle-shaped depression or emboss formed in the tube wall.

The disclosed embodiment of the anvil assembly includes two relatively movable parts having mating inclined surfaces. A threaded member is provided which threadably biases one of the anvil parts to expand or contract the anvil assembly, as described. It will be understood, however, by those skilled in the art that the anvil parts having the mating inclined surfaces may be relatively moved by any suitable means, such as a hydraulic or pneumatic piston or cam assembly. In the disclosed embodiment, one of the parts is wedge-shaped having an inclined surface and generally rectangular in cross-section. The other of the parts includes a generally rectangular slot having an inclined bottom wall which slidably receives the wedge-shaped part. These cam parts are then received in a slot of a mandrel. Where the self-attaching fastener is to be installed in a cylindrical tube, for example, the mandrel preferably includes a cylindrical outer surface. The threaded member is then threaded through an opening in the mandrel and connected to the wedge-shaped part. The wedge-shaped part is then moved relative to the other part by threading the threaded adjustment member. The anvil assembly for installing self-attaching fasteners in a tube further includes a tube cradle which rigidly supports the tube and anvil assembly during installation of the self-attaching fastener.

The method and apparatus of this invention may thus be utilized to install conventional self-attaching fasteners to a metal wall of an enclosed structure from inside the structure with one stroke of a die press. The method and apparatus of this invention may be utilized to install self-attaching fasteners, such as pierce and clinch nuts and studs, in a structural steel tube, from inside the tube, and the tube may be simultaneously embossed to provide a flush-mounting. Finally, the method and apparatus of this invention may be utilized for mass production applications, wherein several self-attaching fasteners are installed with each stroke of the press. Other advantages and meritorious features of the method and apparatus of this invention will be more fully understood from the following description of the preferred embodiments, the appended claims and the drawings, a brief description of which follows.

DESCRIPTION OF A PREFERRED EMBODIMENT OF THE INSTALLATION APPARATUS AND METHOD OF THIS INVENTION

Figures 1, 2, 3:
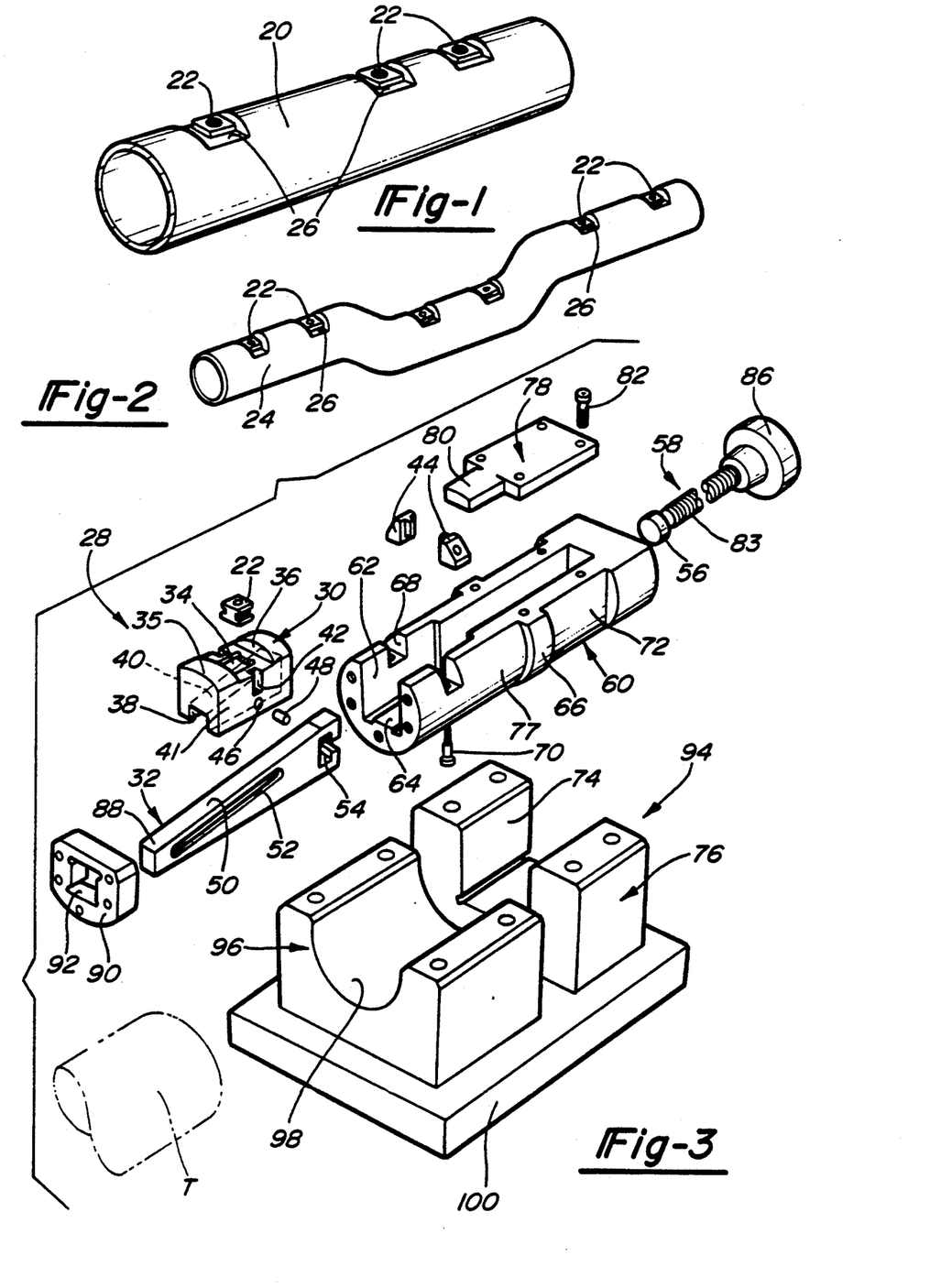
FIG. 1 is a side perspective view of a tube having a plurality of self-attaching fasteners installed from inside the tube by the method and apparatus of this invention.
FIG. 2 is a side perspective view of a contoured structural tube, such as used by the automotive industry, with a plurality of self-attaching fasteners installed in the tube from inside the tube by the method of this invention.
FIG. 3 is an exploded view of one preferred embodiment of an anvil assembly for installing self-attaching fasteners in a tube by the method of this invention.

FIGS. 1 and 2 illustrate a preferred embodiment of pierce nuts 22 installed in cylindrical tubes or pipes 20 and 24, respectively. It will be understood, however, that the method and apparatus of this invention may be adapted to install other types of self-attaching fasteners to a wall of other enclosed structures including, for example, enclosed channels, metal housings, rectangular pipes, and the like. Further, the method of this invention is particularly, but not exclusively adapted to install self-attaching fasteners to a metal wall of an enclosed structure requiring substantial force to install the self-attaching fastener. FIG. 1 illustrates a tube 20 having a plurality of pierce nuts 22 installed by the method of this invention from inside the tube. The tube may be formed of steel, aluminum or other materials. FIG. 2 illustrates a tubular automotive structural cross member 24 which may be formed of structural steel for example. A typical automotive cross member is formed of 1010 steel having a wall thickness of about ⅛ inch and an outside diameter of 2⅜ inches. As shown, the cylindrical tubes 20 and 24 include saddle-shaped depressions 26 having flat bottom surfaces surrounding the pierce nuts 22. These flats may be utilized to receive and support other structural members (not shown), such as exhaust mounting brackets, fuel lines and the like.

The method and apparatus of this invention will now be described with reference to the installation of a pierce nut in a tube or pipe as shown in FIGS. 1 and 2, which is a preferred embodiment of the invention. It is understood, however, that the invention is not limited to the installation of pierce nuts or the installation of self-attaching fasteners in a cylindrical tube.

Figure 4:
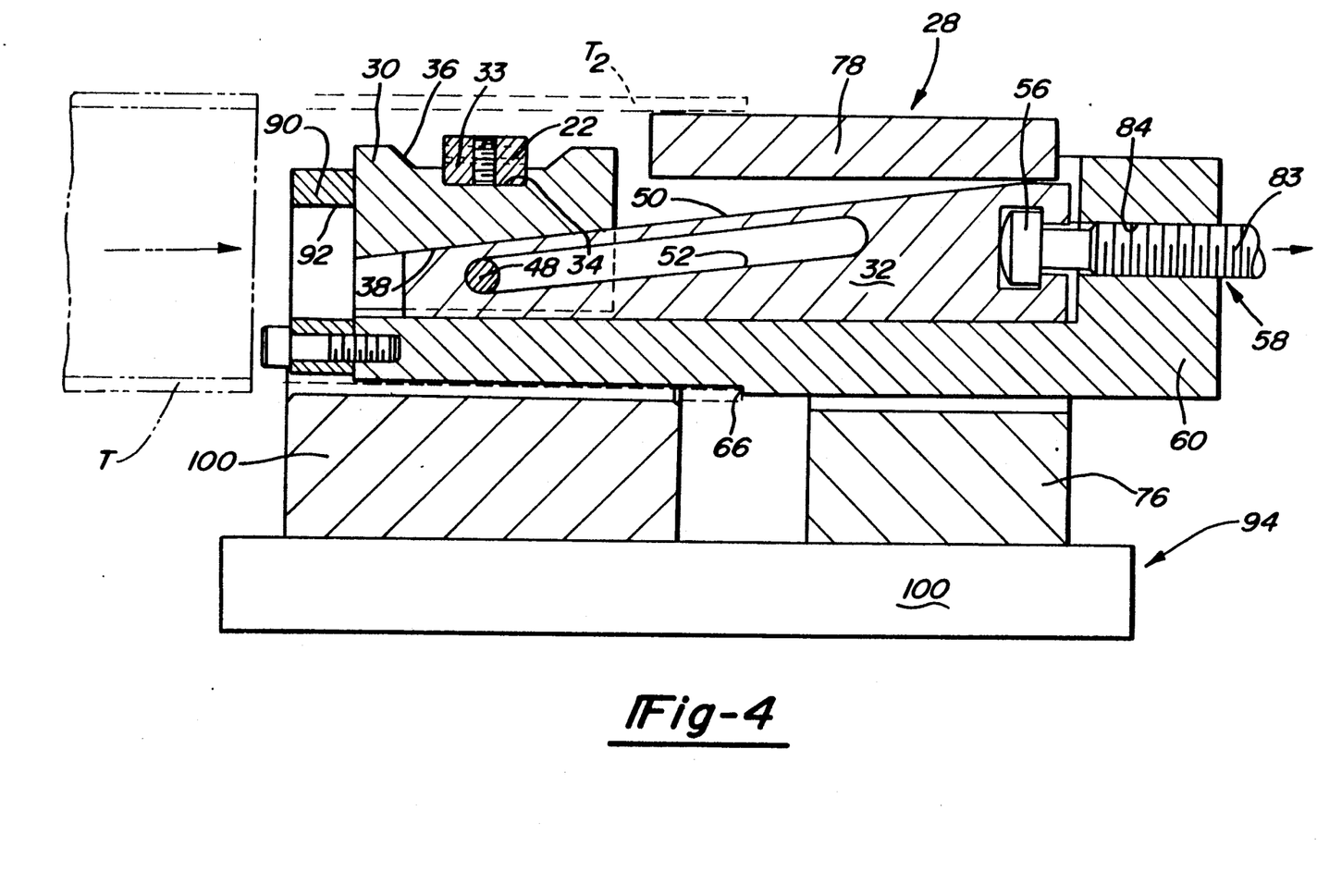
FIG. 4 is a side cross-sectional view of the anvil assembly shown in FIG. 3 with a tube shown in phantom, prior to installation of the self-attaching fastener.
Figure 5:
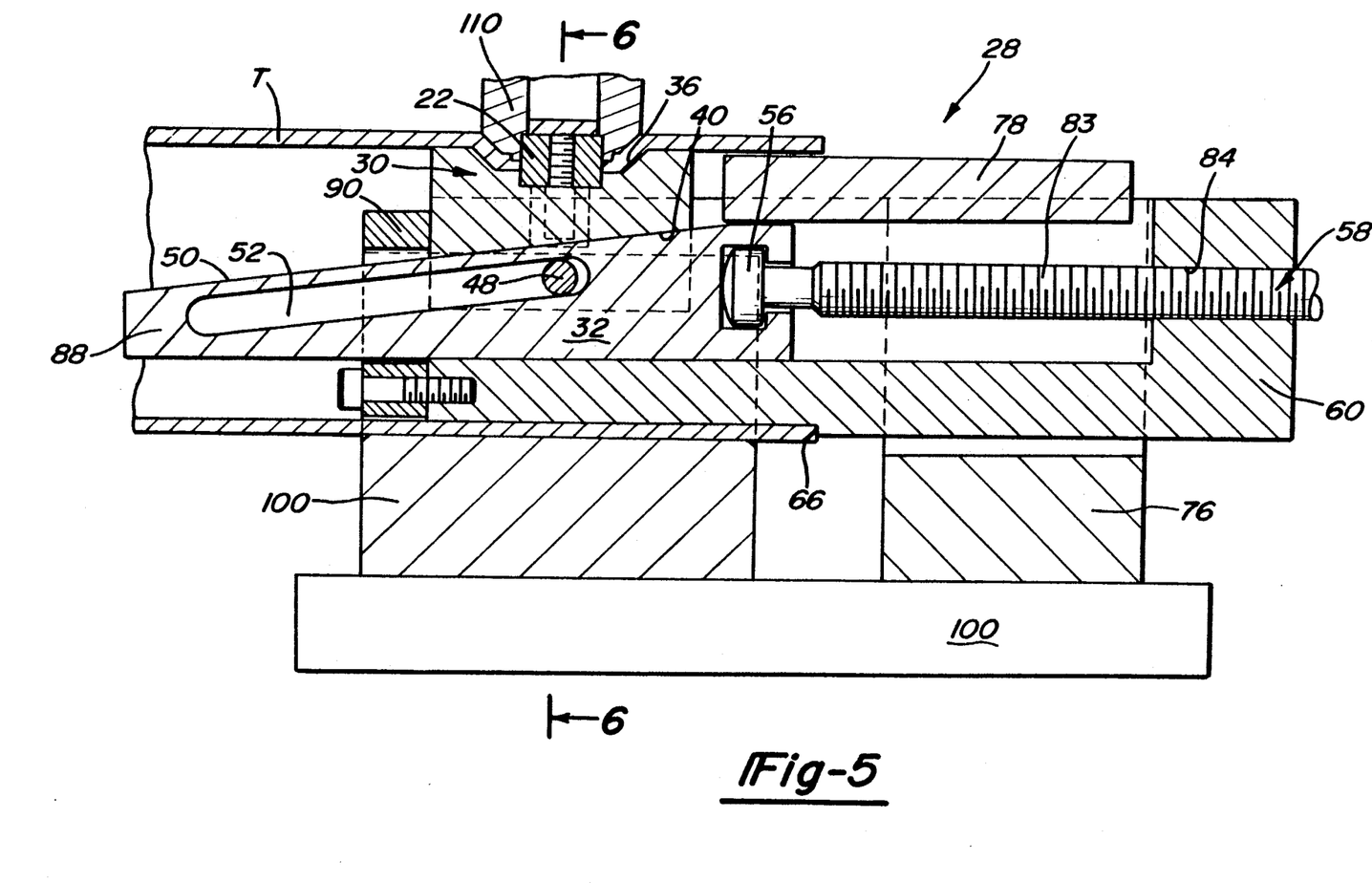
FIG. 5 is a cross-sectional view of the anvil assembly shown in FIG. 4, following installation of a self-attaching fastener in a tube.
Figure 6:
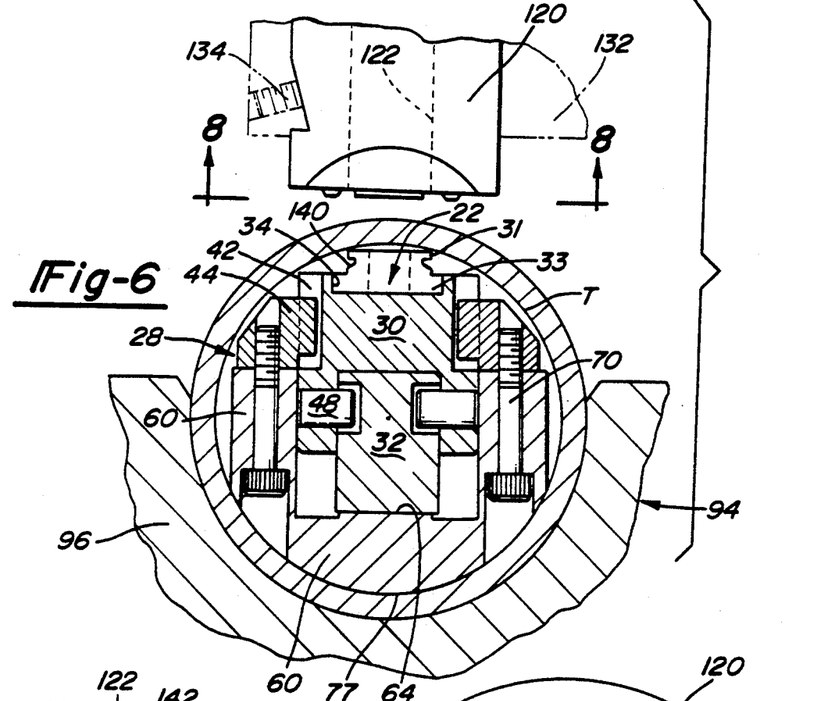
FIG. 6 is a cross-sectional view of the anvil assembly, tube and nut assembly shown in FIG. 5, in the direction of view arrows 6—6, prior to installation of the self-attaching fastener in the tube.

FIG. 3 is an exploded view of the anvil assembly 28 illustrated in FIGS. 4 to 6 which may be utilized for the method of this invention. The anvil assembly 28 includes cam parts 30 and 32, comprising nut holder 30 and cam 32. The nut holder 30 includes a nut pocket 34 which is configured to receive the body portion 33 of pierce nut 22 (see FIG. 6). The cylindrical surface 35 of the nut holder 30 further includes a saddle-shaped recess 36 which surrounds the nut pocket 34 and forms the saddle-shaped recess 26 in the tube, as shown in FIGS. 1 and 2, as described hereinbelow. The nut holder includes an axial slot 38 having an inclined cam surface 40 which receives the cam 32, as described below. The planar side surfaces 41 of the nut holder include vertical slots 42 which receive the guide keys 44. The planar side walls 41 further include transverse bores 46 which receive dowel pins 48.

The cam 32 is rectangular in cross-section and includes an inclined surface 50, which is received within slot 38 and biased against mating inclined surface 40 of nut holder 30. Inclined grooves 52 are provided in the side surfaces of cam 32 which receive dowel pins 48 which guide the movement of the nut holder 30 along the mating inclined surfaces 40 and 50. The rearward end of the cam 32 includes a C-shaped slot 54 which receives the head 56 of adjustment screw 58 for relative movement of the cam 32, as described below.

The cam parts 30 and 32 are received in a slot or channel 62 in mandrel 60. The bottom wall of the channel 62 includes a rail 64 which receives the bottom of the cam 32. A stop 66 is provided on the mandrel to accurately locate the tube T during installation of the self-attaching fastener, as described below. The keys 44 are received in slots 68 of the mandrel and retained therein by socket head cap screws 70. Flats 72 are provided in the side wall of the mandrel, which are machined to accurately fit within the rectangular groove 74 of the guide block 76. The outer surface 77 of the mandrel 60, which is received within the enclosed structure, is preferably configured to conform to the opposed surfaces off the enclosed structure. In this case, the outer surface 77 is cylindrical to conform to the cylindrical inner surface of the tube T.

In the disclosed embodiment of the anvil assembly 28, the rearward end of the slot 62 is covered with a cover plate 78 having a tongue portion 80 which is received within the tube T to which the self-attaching fastener is installed. The tongue 80 may include a cylindrical top surface to conform to the cylindrical inner surface of the tube. The cover plate 78 is retained to the mandrel 60 by cap screws 82. The threaded portion 83 of the adjustment screw 58 is threadably received in a threaded bore 84 in the rearward end of the mandrel 60 as shown in FIGS. 4 and 5. As described above, the head portion 56 of the adjustment member is received in C-shaped slot 54 in the wedge 32 and hand nut or knob 86 is provided at the rearward end of the adjustment screw 58. The cam 32 may thus be extended or retracted within the channel 62 of mandrel 60 to raise or lower the nut holder 30 by rotating the knob 86 of adjustment screw 58.

The free end 88 of cam 32 is received through an opening 92 of end stop 90. The end stop 90 prevents longitudinal movement of the nut holder 30 during installation of the nut as shown in FIGS. 4 and 5 and described hereinbelow. The cylindrical portion 77 of the mandrel 60 is received in cylindrical channel 98 of tube cradle 96 following receipt of the tube T on the mandrel. If, however, the tube is rectangular, for example, the tube cradle 98 will include a rectangular channel and the surface 77 will be rectangular to conform to the surface of the tube. The guide block 76 and tube cradle 96 may be welded or otherwise secured to base plate 100.

The operation of the anvil assembly is best shown in FIGS. 4 to 6. The body portion 33 of the pierce nut 22 is inserted into the nut pocket 34 with the cam 32 retracted in the mandrel 60 as shown in FIG. 4. With the cam 32 retracted as shown in FIG. 4, the anvil assembly 28 has a minimum width or diameter, such that the pierce nut 22 easily clears the inside surface of the tube T as shown in FIG. 4. The anvil assembly 28 is then inserted into the tube T until the tube engages the stop 66 as shown at $T_2$ in FIG. 4. The tube and anvil assembly is then received in the tube cradle and guide block 76, respectively, of base assembly 94.

The cam 32 is then extended by turning adjustment screw 58 as shown in FIGS. 5 and 6. As the cam 32 is extended to the left in FIG. 5, the nut holder 30 is moved upwardly in FIGS. 5 and 6 as the inclined cam surface 40 rides upwardly on the inclined cam surface 50 of the cam 32. The pierce nut 22 is thus raised in the nut pocket 34 of the nut holder 30 until the pilot portion 31 is located adjacent an inner surface of the tube T as shown in FIG. 6. The pierce nut 22 is thus ready for installation.

Figures 7, 8:
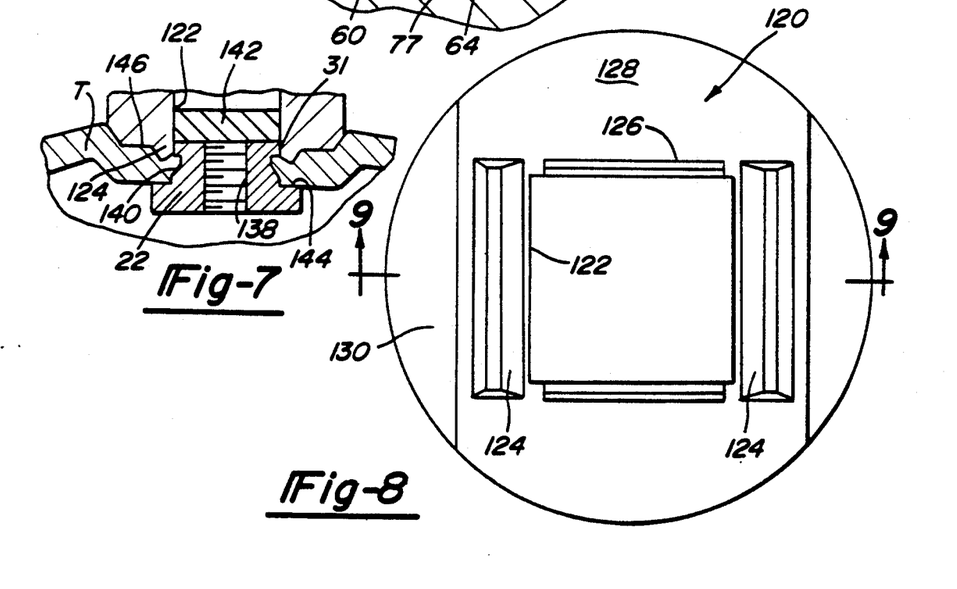
FIG. 7 is a partial cross-sectional view of a tube and nut assembly with a die member, illustrating the die member.
FIG. 8 is an end view of one embodiment of a die member for installing universal pierce nuts in the direction of view arrows 8—8 in FIG. 6.
Figure 9:
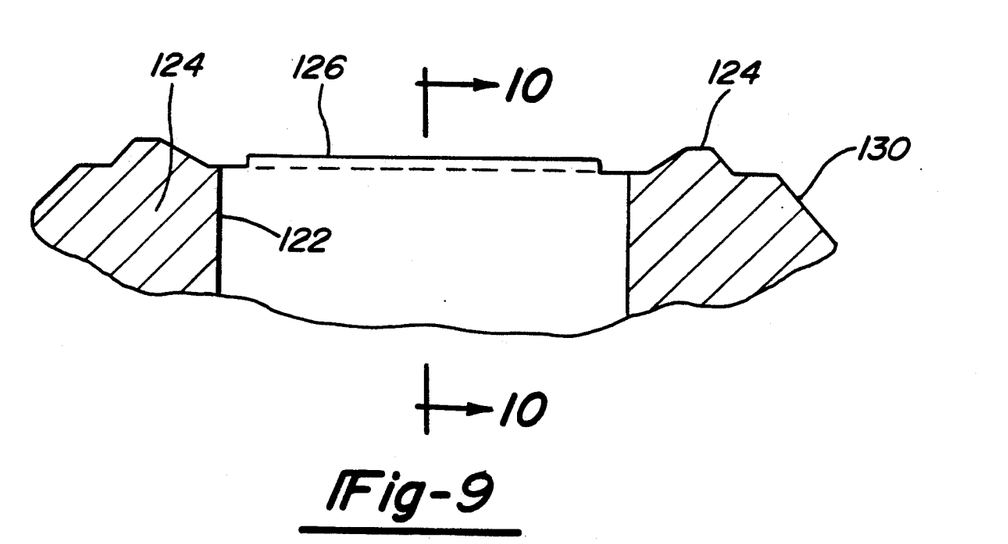
FIG. 9 is a side cross-sectional view of the die member shown in FIGS. 6 to 8.
Figure 10:
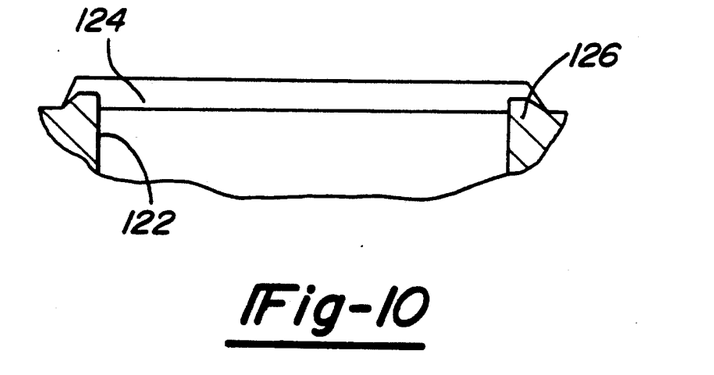
FIG. 10 is a partial side cross-sectional view of the die member shown in FIG. 9, in the direction of view arrows 10—10.

It is important to note that the pierce nut 22 is rigidly and immovably supported in the anvil assembly as shown in FIG. 6. That is, the elements supporting the pierce nut 22 are stacked in face-to-face relation as shown in FIG. 6 to rigidly support the nut, including the nut holder 30, the wedge 32, the mandrel 60, the tube T and the tube cradle 96. The nut pocket 34 prevents any movement of the pierce nut in the nut holder 30 and the end stop 90 prevents any movement of the nut holder. The self-attaching fastener 22 is then installed in the tube by the die button 120 as shown in FIG. 6. The die button 120 is adapted to install a pierce nut of the type shown in FIG. 6. Details of the die button are shown in FIGS. 8, 9 and 10. The die button includes a die opening 122 which is configured to receive the projecting portion of the self-attaching fastener. In the disclosed embodiment, the pilot 31 of the pierce nut (see FIGS. 6 and 7) is rectangular and therefore the die opening 122 is rectangular to closely receive the projecting pilot portion 31 of the nut. Die surfaces 124 and 126 are located on opposite sides of the die opening 122. The die surfaces 124 are generally triangular in cross-section having a truncated end, as best shown in FIGS. 8 and 9. The die surfaces 124 are generally referred to as clinching lips because they clinch metal into the nut grooves as described below. The end 128 of the die button is generally flat having chamfered side surfaces 130 to generally conform to the saddle-shaped recess 36 in the nut holder. It will be understood that the configuration of the die button 120 will depend upon the configuration of the self-attaching fastener. Other types of die members are disclosed in the above-referenced U.S. patents.

As described above, the die button 120 is located opposite the self-attaching fastener 22, which is rigidly supported on the anvil assembly 28 as shown in FIG. 6. The projecting portion 31 of the self-attaching fastener is preferably located adjacent the inner surface of the tube T. The die opening 122 is coaxially aligned with and configured to receive the projecting pilot portion 31 of the nut. The die button 120 is then driven into contact with the outer surface of the tube T to install the self-attaching fastener in the tube. The die member 120 may be supported in a retainer 132, as shown in phantom in FIG. 6. The die button may be retained in the die holder 132 by a set screw 134 or other suitable means. The die holder 132 is then secured in a die platen of a die press (not shown) and the base assembly 94 is retained in the opposite die platen. In a typical application, the base assembly 94 is retained in the lower die platen and the die button 120 and holder 132 are retained in the upper die platen. Of course, however, this arrangement can be reversed. The die button 120 is thus driven against the outer surface of the tube T as the press reciprocates.

FIGS. 5, 6 and 7 best illustrate the installation of the pierce nut 22 in the wall of the tube T. Where a pierce nut 22 having a projecting pilot 31 is installed in a cylindrical tube T, the pierce nut is preferably oriented as shown, such that the pierce nut grooves 140 face generally perpendicular to the axis of the tube as best shown in FIGS. 6 and 7. That is, the pierce nut is oriented generally transverse to the longitudinal axis of the tube. As the die member 120 is driven into the wall of the tube T, the pilot portion 31 is received in the die opening 122 to pierce a slug 142 from the tube wall as shown in FIG. 7. The clinching lips 124 then deform the wall of the tube into locking engagement with the pierce nut grooves 140 and the die member drives the tube wall into mating engagement with the flange or shoulder portions 144 of the body portion of the nut. As shown, the end of the die button, including the flat end face 128 and the chamfered side surfaces 130 generally conform to the saddle-shaped recess 36 in the nut holder 30, such that a saddle-shaped recess 146 is formed in the tube wall simultaneously with the installation of the pierce nut 22 in the tube. This saddle-shaped recess 146 is particularly beneficial in structural tubing because structural elements or components may then be rigidly attached to the structural tube using the integrally-formed self-attaching fastener 22. The pierce nut 22 may include a threaded bore 138 which threadably receives a bolt or screw (not shown) for attachment of other elements. For example, a bracket for a fuel line or another structural element may thus be rigidly attached to the tube.

As will be understood, several self-attaching fasteners may be attached to the enclosed structure with each stroke of the press. A multiple part mandrel assembly having a plurality of nut holders 30 may be supported on a single cam or a plurality of cams. Where the tube preferably has a configured shape, such as the structural tube 24 shown in FIG. 2, the pierce nuts are preferably installed in the tube while the tube 24 is straight. The tube may then be formed into any desired shape by conventional tube forming process and tooling to form the structural tube 24 shown in FIG. 2.

The method of this invention thus briefly includes rigidly supporting a self-attaching fastener 22 in an anvil assembly 28 and locating the projecting fastening portion 31 of the fastener adjacent the inner surface of the enclosed structure T as shown in FIG. 6. In the most preferred embodiment of the method, the body portion 33 is supported in a pocket 34 of the anvil assembly 28, the anvil assembly is then inserted into the enclosed structure and the fastener 22 is then moved to adjacent an inner surface of the wall T while the fastener is rigidly supported on the anvil assembly. A die member 120 is then driven against an outer surface of the tube T to first drive the projecting portion 31 of the fastener through an opening in the panel into the die opening 122. Where the fastener is a self-piercing fastener, such as the pierce nut 22, the projecting pilot portion 31 pierces a slug 142 from the tube wall. The slug 142 and the pilot portion 31 are then received in the die opening 122 as shown in FIG. 7.

In the most preferred embodiment of the method of this invention, a saddle-shaped depression or emboss 146 is formed in the tube wall simultaneously with the installation of the self-attaching fastener 22 in the tube. The term saddle-shaped as used herein, refers to a depression which is generally planar surrounding the fastener as shown in FIGS. 5 and 7. In the disclosed method and apparatus, the anvil assembly includes cam parts 30 and 32 having mating inclined surfaces 40 and 50, respectively, and the self-attaching fastener is moved to adjacent the inner surface of the tube T by moving one of the cam parts. Because the force of installation may be several tons where, for example, the tube or enclosed structure is formed of structural steel, the inclined surfaces should be about seven degrees to avoid lateral translation of the force of installation. Following installation, the cam 32 is again retracted by turning screw adjustment member 58 to generally the position shown in FIG. 4. The anvil assembly 28 may then be easily removed from the tube and the installation is complete.

The material used for the tube T or wall of an enclosed structure will, of course, depend upon the application of the tube or structure. The method and apparatus of this invention, however, is particularly, but not exclusively adapted for installing a self-attaching fastener in a metal tube, including tubes formed of structural steel having a thickness of 1/16 inch to ⅛ inch or greater. A typical structural tube used by the automotive industry has an outside diameter of 2 to 4 inches. Pierce nuts of the type disclosed herein are generally formed from high tensile, low carbon steel. Where the self-attaching fastener is installed in structural steel, the fastener may be heat treated to withstand the forces of installation.

As will be understood, various modifications may be made to the method and apparatus of this invention within the purview of the appended claims. For example, where the wall to which the self-attaching fastener is attached is generally flat, a retractable anvil assembly may not be required. That is, the shape of the mandrel and nut holder will be dependent upon the shape of the wall to which the self-attaching fastener is attached. Further, the method and apparatus of this invention may be utilized to attach a self-clinching fastener to a tube or other enclosed structure having a preformed opening. The method of installation may be identical to the method described herein, except that the projecting portion of the fastener does not pierce the wall opening. Further, the method and apparatus of this invention may be utilized in a punch, rather than a press, in which case the die member is attached to the reciprocating punch. Finally, the wedge 32 may be moved relative to the nut holder 30 by any suitable means, including pneumatic and hydraulic cylinders, cam or lever mechanisms and the like.

What is claimed is:

1. An apparatus for attaching a self-attaching fastener to a generally cylindrical metal tube having a generally cylindrical inner surface from inside said tube, said self-attaching fastener having a body portion and a fastening portion projecting from said body portion, said apparatus comprising:
   a cradle having a concave generally cylindrical exterior surface configured to receive said generally cylindrical tube;
   a mandrel having a generally cylindrical convex external surface configured to be received within said tube and mate with said tube inner surface and said mandrel having a generally flat surface opposite said mandrel generally cylindrical surface;
   a cam member having a flat surface received on said mandrel flat surface and an opposite cam surface inclined relative to said cam member flat surface;
   a fastener holder having an inclined cam surface received on said cam member cam surface, said fastener holder having a fastener pocket configured to receive said self-attaching fastener body portion in a surface of said fastener holder opposite said fastener holder cam surface, and said fastener holder having generally cylindrical convex support surfaces on opposite sides of said fastener pocket spaced above the plane of said fastener pocket configured to mate with said tube inner surface; and
   a die member having an opening configured to receive said self-attaching fastener fastening portion, and said die member having die surfaces on opposite sides of said die opening configured to deform said tube toward said fastener holder fastener pocket into locking engagement with said self-attaching fastener fastening portion;
   whereby a self-attaching fastener supported in said fastener holder of said apparatus may be received in said tube and moved to adjacent said tube inner surface by movement of said cam member relative to said fastener holder and said mandrel, thereby bringing said generally cylindrical support surfaces of said fastener holder into engagement with said tube inner surface and rigidly supporting said self-attaching fastener during installation in said tube by said die member.

2. The apparatus for attaching a self-attaching fastener to a tube as defined in claim 1, characterized in that the surfaces surrounding said fastener pocket define a saddle-shaped recess, including a flat bottom surface surrounding said fastener pocket and opposed outwardly inclined surfaces extending from said flat surface to said generally cylindrical convex support surfaces.

3. The apparatus for attaching a self-attaching fastener to a tube as defined in claim 1, characterized in that said cam member is generally rectangular and said fastener holder includes a rectangular slot which receives said cam member cam surface, said slot having an inclined bottom wall defining said fastener holder cam surface.

4. The apparatus for attaching a self-attaching fastener to a tube as defined in claim 3, characterized in that a side surface of said cam member located between said flat surface and said inclined cam surface includes a slot extending generally parallel to said inclined cam surface of said cam member and said fastener holder including a guide member received in said slot.

5. The apparatus for attaching a self-attaching fastener to a tube as defined in claim 1, characterized in that said mandrel includes a threaded opening which receives a threaded adjustment member, said adjustment member operably connected to said cam member to move said cam member relative to said fastener holder and said mandrel, thereby moving said fastener holder generally cylindrical support surfaces into engagement with said tube inner surface.

6. The apparatus for attaching a self-attaching fastener to a tube as defined in claim 1, characterized in that said mandrel is generally U-shaped having a generally cylindrical exterior surface and a slot defined through an upper surface, the lower surface of said mandrel slot including said flat inner surface receiving said cam member, and grooves on opposed sides of said flat surface.

7. An apparatus for attaching a self-attaching fastener to a generally cylindrical tube having a generally cylindrical inner surface from inside said tube; said self-attaching fastener having a body portion and a fastening portion projecting from said body portion, said apparatus comprising:
   a mandrel having a generally cylindrical convex external surface configured to be received within said tube and mate with said tube inner surface and said mandrel having a flat surface opposite said generally cylindrical surface;
   a cam member having a flat surface received on said mandrel flat surface and an opposite cam surface inclined relative to said cam member flat surface;
   a fastener holder having an inclined cam surface received on said cam member cam surface, said fastener holder having a generally cylindrical convex support surface configured to be received within said tube inner surface and a saddle-shaped recess in said cylindrical surface including a flat bottom surface and opposed outwardly inclined surfaces extending from said flat surface to said generally cylindrical surface, and a fastener pocket in said flat surface configured to receive and support said body portion of said self-attaching fastener;

means adapted to move said cam member relative to said fastener holder and mandrel to increase or decrease the distance between said fastener holder and said tube inner surface to move said self-attaching fastener to locate said fastening portion adjacent said tube inner surface and said fastener holder generally cylindrical convex surface into engagement with said tube inner surface; and a die member having an opening configured to receive said fastening portion of said self-attaching fastener and die surfaces on opposed sides of said die opening configured to deform said tube into said saddle-shaped recess of said fastener holder and into locking engagement with said self-attaching fastener fastening portion.

8. The apparatus for attaching a self-attaching fastener to a tube as defined in claim 7, characterized in that said cam member is generally rectangular and said fastener holder includes a rectangular slot which receives said cam member, said fastener holder slot having an inclined bottom wall defining said cam surface.

9. The apparatus for attaching a self-attaching fastener to a tube as defined in claim 2, characterized in that a side surface of said cam member located between said cam member flat surface and said inclined surface includes a slot extending generally parallel to said cam member inclined surface, and said fastener holder including a guide member received in said slot.

10. The apparatus for attaching a self-attaching fastener to a tube as defined in claim 7, characterized in that said apparatus includes a cradle having a concave generally cylindrical surface configured to receive said generally cylindrical tube.

* * * * *